United States Patent
Uesugi et al.

(10) Patent No.: US 7,609,030 B2
(45) Date of Patent: Oct. 27, 2009

(54) CAPACITY ADJUSTMENT APPARATUS AND CAPACITY ADJUSTMENT METHOD FOR BATTERY PACK

(75) Inventors: Yukio Uesugi, Atsugi (JP); Shinsuke Yoshida, Hadano (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 188 days.

(21) Appl. No.: 11/313,678

(22) Filed: Dec. 22, 2005

(65) Prior Publication Data

US 2006/0139004 A1 Jun. 29, 2006

(30) Foreign Application Priority Data

Dec. 27, 2004 (JP) ............................. 2004-376620
Sep. 15, 2005 (JP) ............................. 2005-268083

(51) Int. Cl.
*H02J 7/00* (2006.01)
(52) U.S. Cl. ...................... 320/118; 320/116; 320/122
(58) Field of Classification Search ................ 320/116, 320/118, 119, 120, 121, 122, 132
See application file for complete search history.

(56) References Cited

U.S. PATENT DOCUMENTS

| | | | | |
|---|---|---|---|---|
| 5,850,136 | A * | 12/1998 | Kaneko | 320/119 |
| 6,046,573 | A * | 4/2000 | Wikstrom | 320/118 |
| 2001/0054877 | A1* | 12/2001 | Kinoshita | 320/112 |
| 2002/0084770 | A1* | 7/2002 | Jabaji | 320/118 |
| 2002/0190692 | A1* | 12/2002 | Marten | 320/116 |
| 2004/0251874 | A1* | 12/2004 | Petitdidier | 320/118 |
| 2006/0022646 | A1* | 2/2006 | Moore et al. | 320/150 |
| 2006/0097698 | A1* | 5/2006 | Plett | 320/118 |

FOREIGN PATENT DOCUMENTS

JP 10-191574 A 7/1998

* cited by examiner

*Primary Examiner*—Edward Tso
*Assistant Examiner*—Ramy Ramadan
(74) *Attorney, Agent, or Firm*—Foley & Lardner LLP

(57) ABSTRACT

A capacity adjustment circuit provided in conjunction with each cell discharges the corresponding cell if the cell voltage is higher than a bypass operating voltage and, as a result, the extent of inconsistency among the voltages at the individual cells is minimized. A cell switching circuit switches the connections between the individual cells and the capacity adjustment circuits over predetermined time intervals.

22 Claims, 12 Drawing Sheets

LV CELL OPEN VOLTAGE

CAPACITY ADJUSTMENT APPARATUS AND CAPACITY ADJUSTMENT METHOD FOR BATTERY PACK

BACKGROUND OF THE INVENTION

1. Field of the Invention

The present invention relates to an apparatus and a method to be adopted for capacity adjustment of a plurality of cells constituting a battery pack.

2. Description of Related Art

There is an apparatus known in the related art that adjusts the voltages at the individual cells constituting a battery pack to a predetermined reference voltage level by using a voltage comparison circuit and a capacity adjustment circuit included therein in correspondence to each cell (see Japanese Laid Open Patent Publication No. H10-191574). In this apparatus, the voltage comparison circuit compares the voltage at the corresponding cell with the reference voltage and the cell is discharged by the capacity adjustment circuit if the cell voltage is higher than the reference voltage.

SUMMARY OF THE INVENTION

The apparatus in the related art poses a problem in that the cell voltages may not be adjusted to a uniform level through the capacity adjustment if there is any error in the voltage comparison executed by the voltage comparison circuits or any error in the discharge currents used at the capacity adjustment circuits to discharge the cells.

It would be desirable to provide a capacity adjustment apparatus for a battery pack constituted by connecting a plurality of cells in series which includes a plurality of capacity adjustment circuits used to discharge cells with voltages higher than a predetermined voltage, and a switching circuit that switches connections between the plurality of cells and the plurality of capacity adjustment circuits.

It would be desirable to provide a battery pack capacity adjustment method through which a cell with a voltage higher than a predetermined voltage among a plurality of cells constituting a battery pack is discharged via a capacity adjustment circuits. In the battery pack capacity adjustment method, connections between the plurality of cells and a plurality of capacity adjustment circuits are switched.

DETAILED DESCRIPTION OF PREFERRED EMBODIMENTS

First Embodiment

Figure 1:
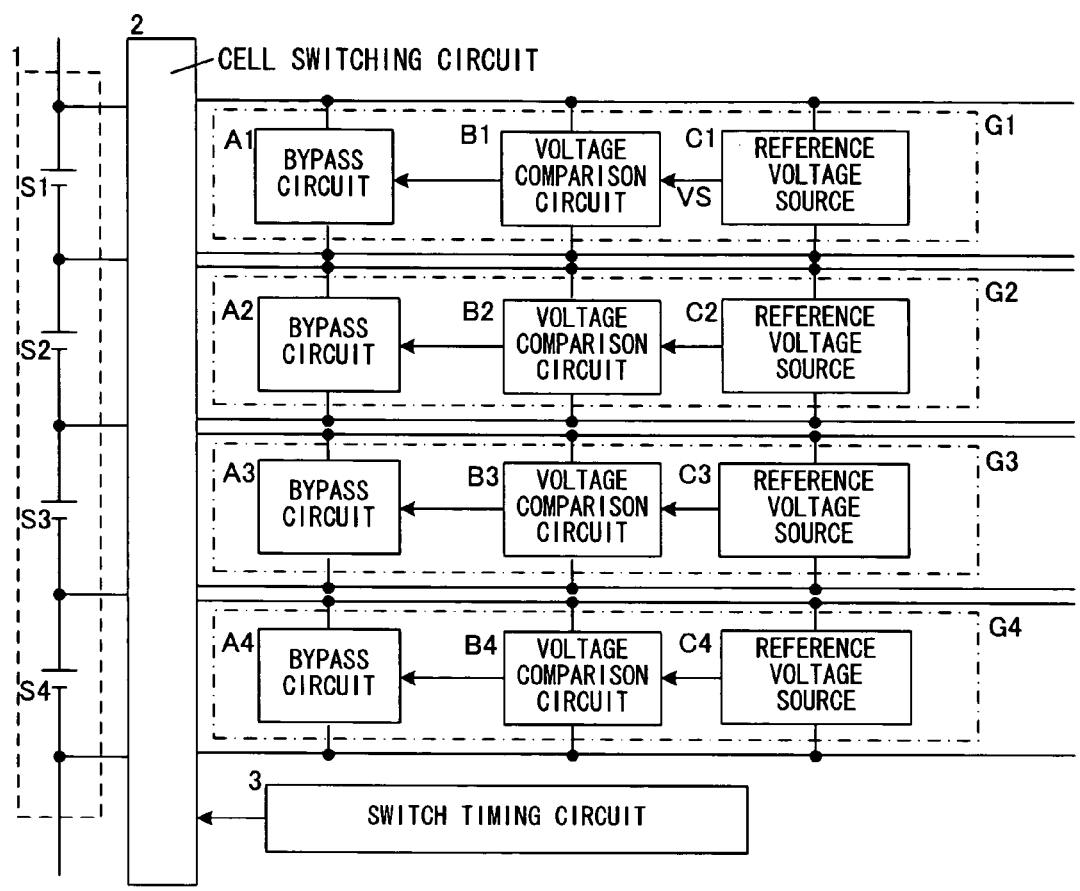
FIG. 1 shows the structure adopted in the battery pack capacity adjustment apparatus in a first embodiment.

FIG. 1 shows the structure of the battery pack capacity adjustment apparatus in the first embodiment. The battery pack capacity adjustment apparatus in the first embodiment comprises capacity adjustment circuits G1 through G4, a cell switching circuit 2 and a switch timing circuit 3. A battery pack 1 includes four cells s1 through s4 connected in series, which can be charged/discharged. The capacity adjustment circuits G1 through G4, each provided in conjunction with one of the cells s1 through s4, respectively include bypass circuits A1 through A4, voltage comparison circuits B1 through B4 and reference voltage sources C1 through C4. Namely, the bypass circuits A1 through A4, the voltage comparison circuits B1 through B4 and the reference voltage sources C1 through C4 are all provided in quantities matching the number of cells (four) constituting the battery pack 1.

Figure 2:
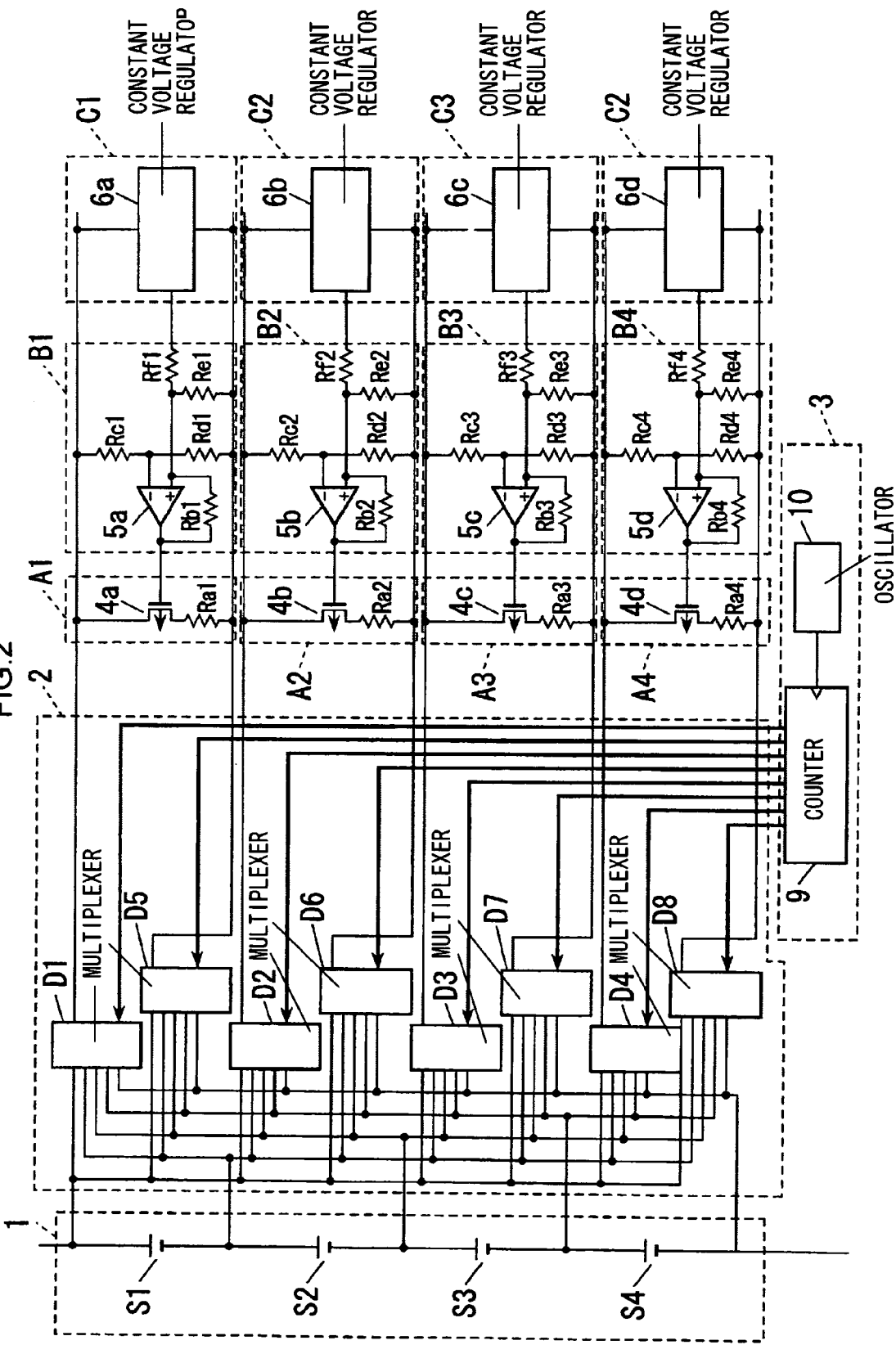
FIG. 2 shows in detail the structures of the bypass circuits, the voltage comparison circuits, the reference voltage sources, the cell switching circuit and the switch timing circuit.

FIG. 2 shows in detail the structures of the bypass circuits A1 through A4, the voltage comparison circuits B1 through B4, the reference voltage sources C1 through C4, the cell switching circuit 2 and the switch timing circuit 3. The bypass circuit A1 comprises a P-MOSFET 4a and a discharge resistor Ra1. The voltage comparison circuit B1 comprises an operational amplifier 5a and resistors Rb1, Rc1, Rd1, Re1 and Rf1. The reference voltage source C1 is constituted with a constant voltage regulator 6a.

The constant voltage regulator 6a outputs a predetermined reference voltage Vs. The voltage value of the reference voltage Vs output from the constant voltage regulator 6a is adjusted at the resistors Re1 and Rf1 and is then input to a non-inversion input terminal (+terminal) at the operational amplifier 5a. The voltage value representing the voltage achieved by dividing the voltage at the cell s1 at the resistors Rc1 and Rd1 is input to an inversion input terminal (−terminal) at the operational amplifier 5a. If the voltage value input to the inversion input terminal is higher than the voltage value input to the non-inversion input terminal, the operational amplifier 5a outputs an L-level signal to a gate terminal of the P-MOSFET 4a, whereas if the voltage value input to the non-inversion input terminal is higher than the voltage value input to the inversion input terminal, the operational amplifier 5a outputs an H-level signal to the gate terminal of the P-MOSFET 4a. It is to be noted that the voltage comparison circuit B1, which forms a positive feedback loop with the resistor Rb1, has hysteresis characteristics.

The P-MOSFET 4a enters an ON state as the L-level signal is input to the gate terminal thereof and enters an OFF state as the H-level signal is input. Namely, the P-MOSFET 4a enters an ON state when the voltage value input to the inversion input terminal at the operational amplifier 5a is higher than the voltage value input to the non-inversion input terminal. In order to simplify the explanation, it is assumed that the P-MOSFET 4a is turned on if the voltage value at the cell s1 is higher than a predetermined voltage of a bypass operating voltage Vbps and that the P-MOSFET 4a is turned off if the voltage value at the cell s1 is lower than the predetermined voltage of the bypass operating voltage Vbps. As the P-MOSFET 4a enters an ON state, the cell s1 is discharged via the discharge resistor Ra1 connected in series to the P-MOSFET 4a.

While an explanation is given above in reference to the bypass circuit A1, the voltage comparison circuit B1 and the reference voltage source C1, the bypass circuits A2 through A4, the voltage comparison circuits B2 through B4 and the reference voltage sources C2 through C4 all adopt identical structures and engage in identical operations.

The cell switching circuit 2 and the switch timing circuit 3 are used to switch connections between the individual bypass circuits A1 through A4 and the cells s1 through s4. For instance, if a cell switching signal is input from the switch timing circuit 3 to the cell-switching circuit 2 while the cell s1, the cell s2, the cell s3 and the cell s4 are respectively connected with the bypass circuit A1, the bypass circuit A2, the bypass circuit A3 and the bypass circuit A4, the connections between the individual cells s1 through s4 and the bypass circuits A1 through A4 are switched so as to connect the cell s1 to the bypass circuit A4, the cell s2 to the bypass circuit A1, the cell s3 to the bypass circuit A2 and the cell s4 to the bypass circuit A1.

As shown in FIG. 2, the cell switching circuit 2 includes multiplexers D1 through D8, whereas the switch timing circuit 3 includes a counter 9 and an oscillator 10. The multiplexer D1 connects the source of the P-MOSFET 4a to the positive electrode of one of the cells s1 through s4. Likewise, each of the multiplexers D2 through D4 connects the source of the corresponding P-MOSFET 4b through 4d with the positive electrode at one of the cells s1 through s4. In addition, the multiplexers D5 through D8 each connect the drain of the corresponding P-MOSFET 4a through 4d with the negative electrode at one of the cells s1 through s4 via the corresponding discharge resistor Ra1 through Ra4.

The oscillator 10 outputs a signal to the counter 14 over predetermined cycles. The predetermined cycles are the switching cycles that determine the timing with which the connections between the cells s1 through s4 and the bypass circuits A1 through A4 are switched and each cycle interval should last over an optimal length of time determined in advance based upon the number of cells constituting the battery pack 1, the length of time required to even out errors at the circuit elements, the values of the bypass currents at the bypass circuits A1 through A4 and the like. For instance, the time interval representing the predetermined cycles should be set to a smaller value as the number of cells becomes greater, and should also be set to a smaller value as the bypass current value increases.

The counter 9 increments its count value as a signal is input thereto from the oscillator 10 and outputs the count value to the multiplexers D1 through D8. The counter 9 outputs 1 as the initial count value and increments the count value by 1 as a signal is input from the oscillator 10 over each cycle. Once the count value reaches 4, it is reset to 1. In other words, the count value changes in reiterative cycles of 1->2->3->4->1.

When the count value output from the counter 9 is 1, the multiplexers D1 through D4 respectively connect the source of the P-MOSFET 4a to the positive electrode of the cell s1, the source of the P-MOSFET 4b to the positive electrode of the cell s2, the source of the P-MOSFET 4c to the positive electrode of the cell s3 and the source of the P-MOSFET 4d to the positive electrode of the cell s4. In addition, the multiplexers D5 through D8 respectively connect the drain of the P-MOSFET 4a to the negative electrode of the cell s1, the drain of the P-MOSFET 4b to the negative electrode of the cell s2, the drain of the P-MOSFET 4c to the negative electrode of the cell s3 and the drain of the P-MOSFET 4d to the negative electrode of the cell s4 via the corresponding discharge resistors Ra1 through Ra4. Namely, when the count value from the counter 9 indicates 1, the bypass circuits A1 through A4 respectively discharge the cells s1 through s4 in correspondence to the individual cell voltages.

When the count value output from the counter 9 is 2, the multiplexers D1 through D4 respectively connect the source of the P-MOSFET 4a to the positive electrode of the cell s2, the source of the P-MOSFET 4b to the positive electrode of the cell s3, the source of the P-MOSFET 4c to the positive electrode of the cell s4 and the source of the P-MOSFET 4d to the positive electrode of the cell s1. In addition, the multiplexers D5 through D8 respectively connect the drain of the P-MOSFET 4a to the negative electrode of the cell s2, the drain of the P-MOSFET 4b to the negative electrode of the cell s3, the drain of the P-MOSFET 4c to the negative electrode of the cell s4 and the drain of the P-MOSFET 4d to the negative electrode of the cell s1 via the corresponding discharge resistors Ra1 through Ra4. Namely, when the count value from the counter 9 indicates 2, the bypass circuits A1 through A4 respectively discharge the cells s2, s3, s4 and s1 in correspondence to the individual cell voltages.

When the count value output from the counter 9 is 3, the multiplexers D1 through D4 respectively connect the source of the P-MOSFET 4a to the positive electrode of the cell s3, the source of the P-MOSFET 4b to the positive electrode of the cell s4, the source of the P-MOSFET 4c to the positive electrode of the cell s1 and the source of the P-MOSFET 4d to the positive electrode of the cell s2. In addition, the multiplexers D5 through D8 respectively connect the drain of the P-MOSFET 4a to the negative electrode of the cell s3, the drain of the P-MOSFET 4b to the negative electrode of the cell s4, the drain of the P-MOSFET 4c to the negative electrode of the cell s1 and the drain of the P-MOSFET 4d to the negative electrode of the cell s2 via the corresponding discharge resistors Ra1 through Ra4. Namely, when the count value from the counter 9 indicates 3, the bypass circuits A1 through A4 respectively discharge the cells s3, s4, s1 and s2 in correspondence to the individual cell voltages.

When the count value output from the counter 9 is 4, the multiplexers D1 through D4 respectively connect the source of the P-MOSFET 4a to the positive electrode of the cell s4, the source of the P-MOSFET 4b to the positive electrode of the cell s1, the source of the P-MOSFET 4c to the positive electrode of the cell s2 and the source of the P-MOSFET 4d to the positive electrode of the cell s3. In addition, the multiplexers D5 through D8 respectively connect the drain of the P-MOSFET 4a to the negative electrode of the cell s4, the drain of the P-MOSFET 4b to the negative electrode of the cell s1, the drain of the P-MOSFET 4c to the negative electrode of the cell s2 and the drain of the P-MOSFET 4d to the negative electrode of the cell s3 via the corresponding discharge resistors Ra1 through Ra4. Namely, when the count value from the counter 9 indicates 4, the bypass circuits A1 through A4 respectively discharge the cells s4, s1, s2 and s3 in correspondence to the individual cell voltages.

As described above, the battery pack capacity adjustment apparatus in the first embodiment switches the connections between the individual bypass circuits A1 through A4 and the cells s1 through s4 for each switching cycle elapsing over the predetermined length of time. As a result, even when there are errors occurring in the voltage comparison executed by the voltage comparison circuits B1 through B4, errors in the reference voltages output by the reference voltage sources C1 through C4, errors in the bypass currents flowing while the cells are being discharge by the bypass circuits A1 through A4 or the like, these errors can be canceled out through the capacity adjustment.

Figure 3:
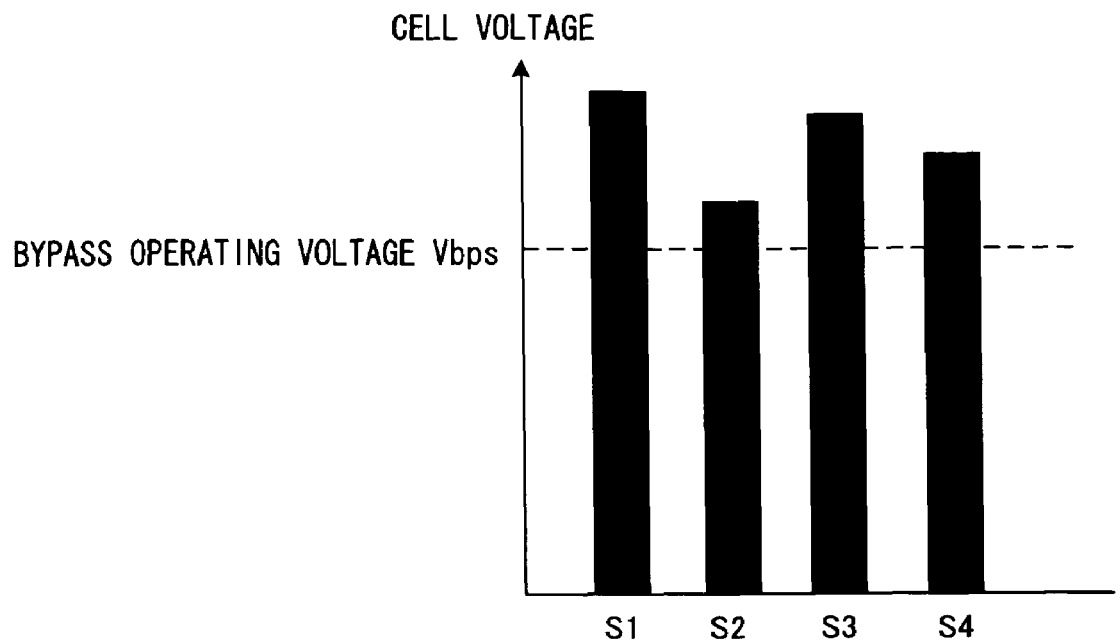
FIG. 3 shows an example of inconsistency among the voltages at individual cells, that may be observed prior to capacity adjustment.
Figure 4:
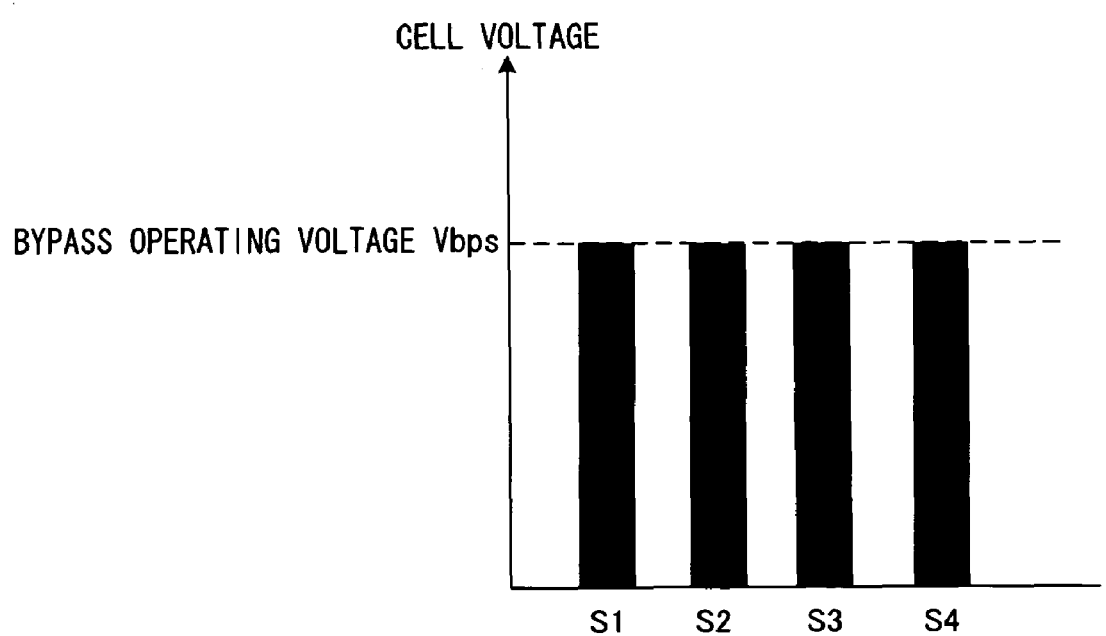
FIG. 4 shows the voltages at the individual cells measured after the capacity adjustment when there is no circuit element error.

In reference to FIGS. 3 through 6, the advantage of the capacity adjustment executed by the battery pack capacity adjustment apparatus in the first embodiment is explained. FIG. 3 shows an example of inconsistency among the voltages at the individual cells s1 through s4 that may manifest prior to the capacity adjustment. As FIG. 3 indicates, the voltages at the cells s1 through s4 all exceed the bypass operating voltage Vbps. FIG. 4 shows the voltages at the individual cells measured after the capacity adjustment, when there are no circuit element errors such as those described above. In this case, the voltages at the cells s1 through s4 are all sustained at the level of the bypass operating voltage Vbps, as shown in FIG. 4, regardless of whether the capacity adjustment is executed by the battery pack capacity adjustment apparatus in the first embodiment or by a capacity adjustment apparatus in the related art that does not switch the connections between the bypass circuits A1 through A4 and the cells s1 through s4.

Figure 5:
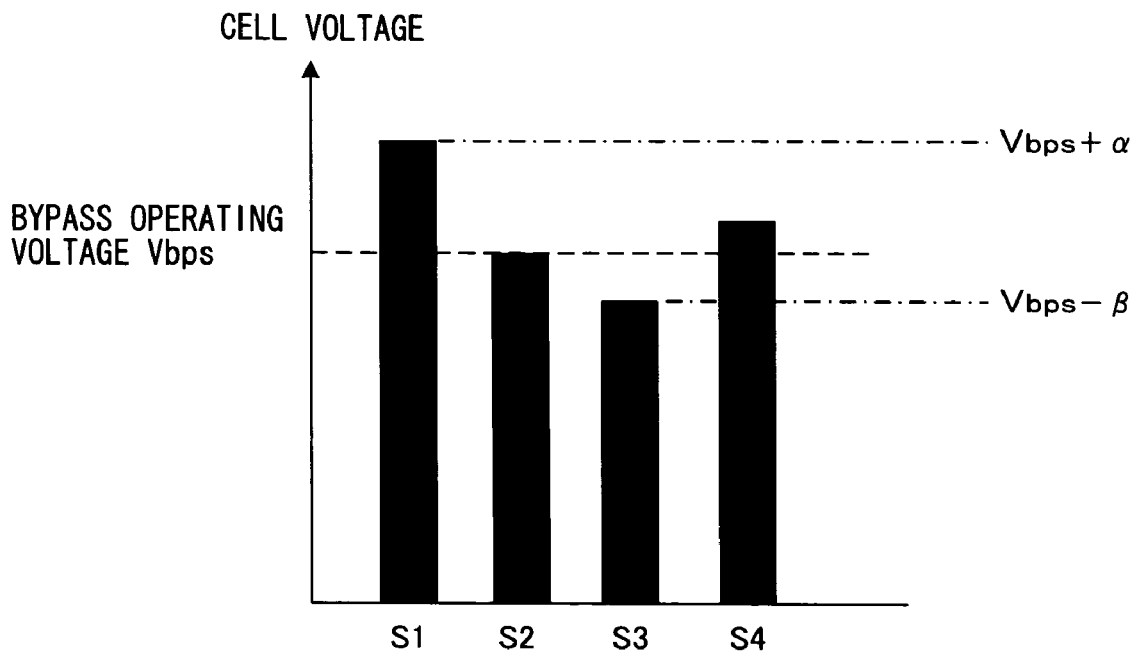
FIG. 5 shows the voltages at the individual cells measured after the capacity adjustment executed in a capacity adjustment apparatus in the related art without switching the bypass circuit cell connections.

FIG. 5 shows the voltages at the individual cells following the capacity adjustment executed by the capacity adjustment apparatus in the related art that does not switch the connections between the bypass circuits A1 through A4 and the cells s1 through s4. Due to errors in the voltage comparison executed by the voltage comparison circuits B1 through B4, errors in the reference voltage output by the reference voltage sources C1 through C4, errors in the bypass currents flowing while the cells are discharged by the bypass circuits A1 through A4 and the like, the post-capacity adjustment voltages at the various cells are not consistent and some deviate from the level of the bypass operating voltage Vbps. In other words, there is a slight inconsistency among the voltages even after the capacity adjustment. In the example presented in FIG. 5, the highest post-capacity adjustment cell voltage is Vbps+α whereas the lowest post-capacity adjustment cell voltage is Vbps−β.

Figure 6:
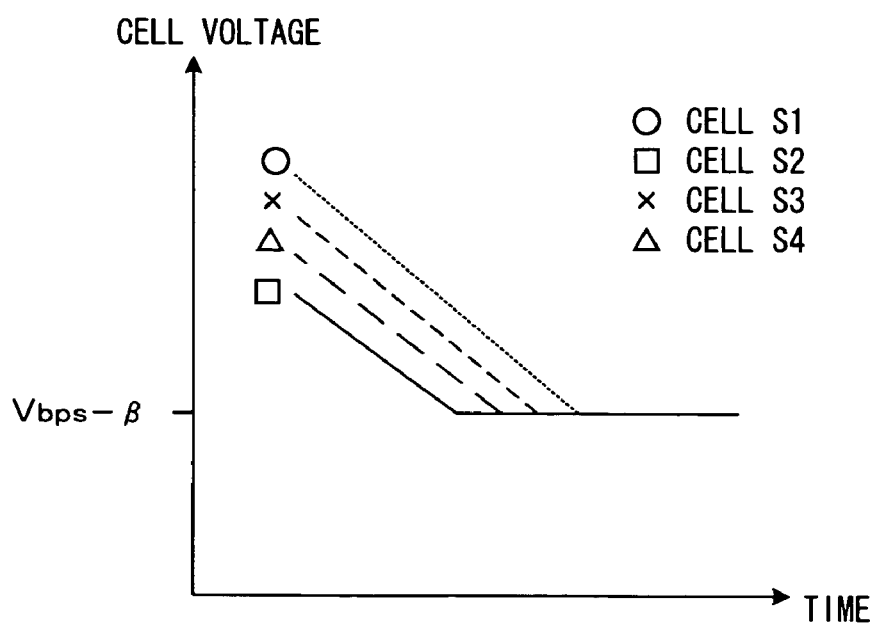
FIG. 6 shows a voltage inconsistency convergence effect achieved by executing the capacity adjustment with the battery pack capacity adjustment apparatus in the first embodiment.

FIG. 6 illustrates the voltage inconsistency convergence effect achieved by executing the capacity adjustment with the battery pack capacity adjustment apparatus in the first embodiment. Even when there are circuit element errors such as errors in the voltage comparison executed by the voltage comparison circuits B1 through B4, errors in the reference voltages output from the reference voltage sources C1 through C4 or errors in the bypass currents at the bypass circuits A1 through A4, such errors are canceled out through the capacity adjustment by switching the connections between the individual bypass circuits A1 through A4 and the cells s1 through s4 over the predetermined time intervals. In this situation, the voltages at the individual cells are adjusted to Vbps−β, i.e., the level of the lowest post-capacity adjustment cell voltage measured without switching the connections.

The battery pack capacity adjustment apparatus achieved in the first embodiment, which switches the connections between the individual cells s1 through s4 and the bypass circuits A1 through A4, achieves consistency among the cell voltages through the capacity adjustment even when there are circuit element errors such as errors in the voltage comparison executed by the voltage comparison circuits B1 through B4, errors in the reference voltages output by the reference voltage sources C1 through C4 or errors in the bypass currents at the bypass circuits A1 through A4, by canceling out such errors during the capacity adjustment.

The battery pack capacity adjustment apparatus achieved in the first embodiment, which switches the connections between the cells s1 through s4 and the bypass circuits A1 through A4 over the predetermined time intervals, is particularly effective in improving the accuracy with which uniformity is achieved among the cell voltages through the capacity adjustment.

Second Embodiment

Figure 7:
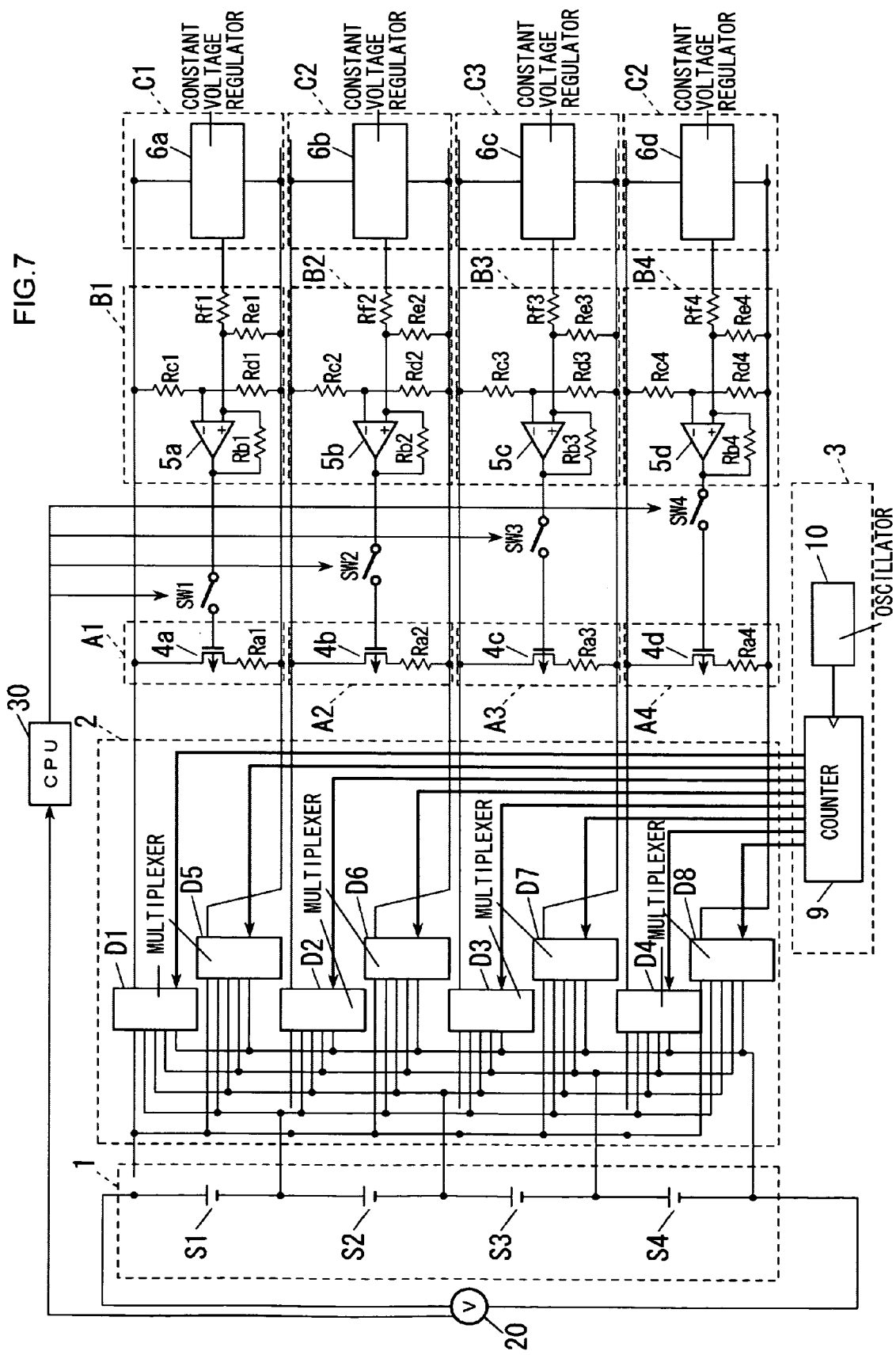
FIG. 7 shows the structure adopted in the battery pack capacity adjustment apparatus in a second embodiment.

The battery pack capacity adjustment apparatus in the second embodiment executes capacity adjustment via the bypass circuits A1 through A4 if a cell SOC is greater than a predetermined SOC. FIG. 7 shows the structure of the battery pack capacity adjustment apparatus in the second embodiment. The battery pack capacity adjustment apparatus in the second embodiment further includes switches SW1 through SW4, a voltage sensor 20 and a CPU 30, in addition to the components constituting the battery pack capacity adjustment apparatus in FIG. 2 in reference to which the first embodiment has been explained.

The switch SW1, which is disposed between the output terminal of the operational amplifier 5a and the gate terminal of the P-MOSFET 4a, is turned ON/OFF based upon a control signal output by the CPU 30. Likewise, the switches SW2 through SW4 disposed between the output terminals at the corresponding operational amplifiers 5b through 5d and the gate terminals of the corresponding P-MOSFETs 4b through 4d respectively, are turned ON/OFF based upon a control signal output from the CPU 30. It is to be noted that the switches SW1 through SW4 are electrically isolatable switches, such as photo couplers or optical MOSFETs.

The CPU 30 executes ON/OFF control for the switches SW1 through SW4 based upon an SOC of the cells s1 through s4 constituting the battery pack 1. Namely, if the SOC of the cells s1 through s4 is equal to or greater than a predetermined SOC, it turns on the switches SW1 through SW4, whereas if the SOC of the cells s1 through s4 is less than the predetermined SOC, it turns off the switches SW1 through SW4. The predetermined SOC should assume a value at least higher than 50%, e.g., 70%. When the cell SOC is equal to or higher than the predetermined SOC, control for limiting the extent to which the battery pack 1 is charged is executed in order to prevent cell overcharging. Accordingly, by turning on the switches SW1 through SW4 to set the bypass circuits A1 through A4 in an operational state when the cell SOC is equal to or greater than the predetermined SOC, the power in the battery pack 1 can be utilized effectively.

Figure 8:
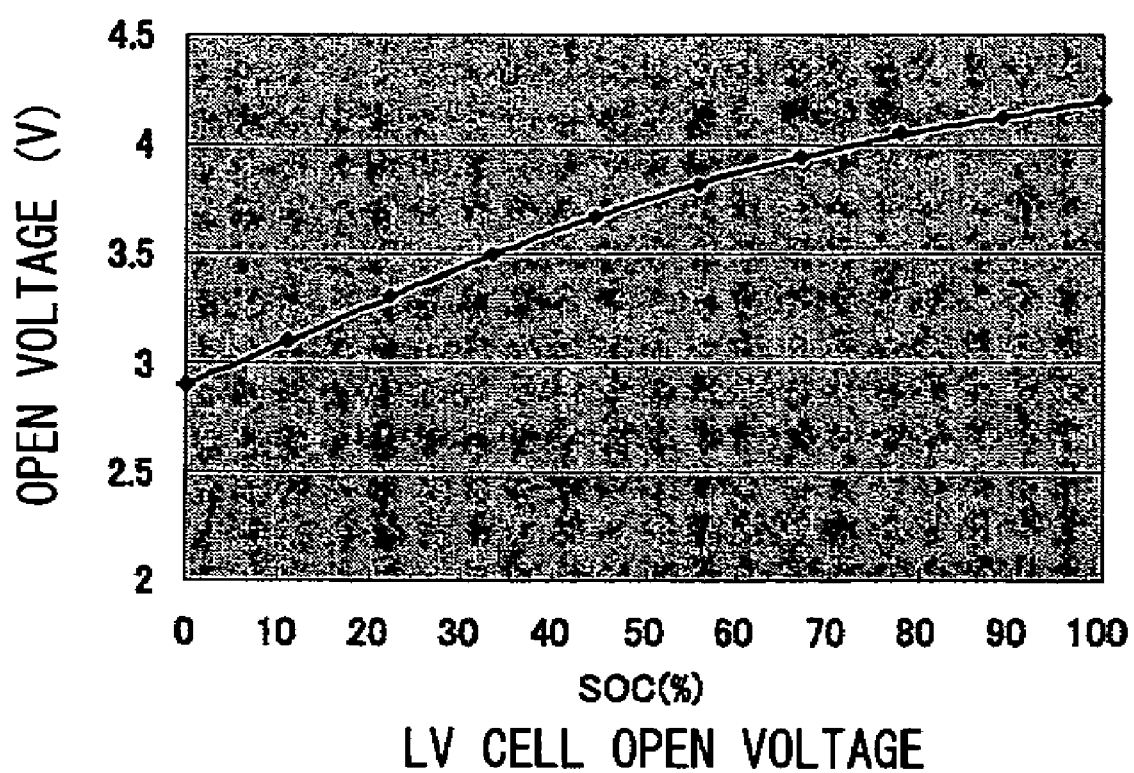
FIG. 8 shows the relationship between the cell voltage (open voltage) and the cell SOC.

FIG. 8 shows the relationship between the cell voltage (open voltage) and the cell SOC. A table indicating the relationship between the cell voltage and the SOC, such as that shown in FIG. 8, is stored in memory in advance at the CPU 30. The CPU 30 determines the cell SOC based upon the table stored in memory in advance and an average cell voltage calculated by dividing the total voltage Vbat at the battery pack 1 detected by the voltage sensor 20 by the number of cells, i.e., four. If the SOC thus determined is equal to or greater than the predetermined SOC (e.g., 70%), a control signal for turning on all the switches SW1 through SW4 is output to the switches SW1 through SW4, whereas if the SOC is less than the predetermined SOC, a control signal for turning off all the switches SW1 through SW4 is output to the switches SW1 through SW4.

The CPU 30 also executes control for stopping the operation of the oscillator 10 if the cell SOC having been ascertained is less than the predetermined SOC or control for engaging the oscillator 10 in operation if the SOC is equal to or greater than the predetermined SOC. If the cell SOC is less than the predetermined SOC, all the switches SW1 through SW4 are turned off so as to set the bypass circuits A1 through A4 in a non-operational state. Accordingly, the operation of the oscillator 10 is stopped so that the connections between the cells s1 through s4 and the bypass circuits A1 through A4 are not switched unnecessarily.

The battery pack capacity adjustment apparatus achieved in the second embodiment, which sets the bypass circuits A1 through A4 in an operational state when the cell SOC is equal to or greater than the predetermined SOC and sets the bypass circuits A1 through A4 in a non-operational state if the cell SOC is less than the predetermined SOC, allows efficient utilization of the power in the battery pack 1 (cells) in a high cell SOC range.

In addition, since the battery pack capacity adjustment apparatus achieved in the second embodiment does not switch the connections between the plurality of cells s1 through s4 and the plurality of bypass circuits A1 through A4 if the cell SOC is less than the predetermined SOC, the connections are not switched unnecessarily when the bypass circuits A1 through A4 are in a non-operational state.

Third Embodiment

Figure 9:
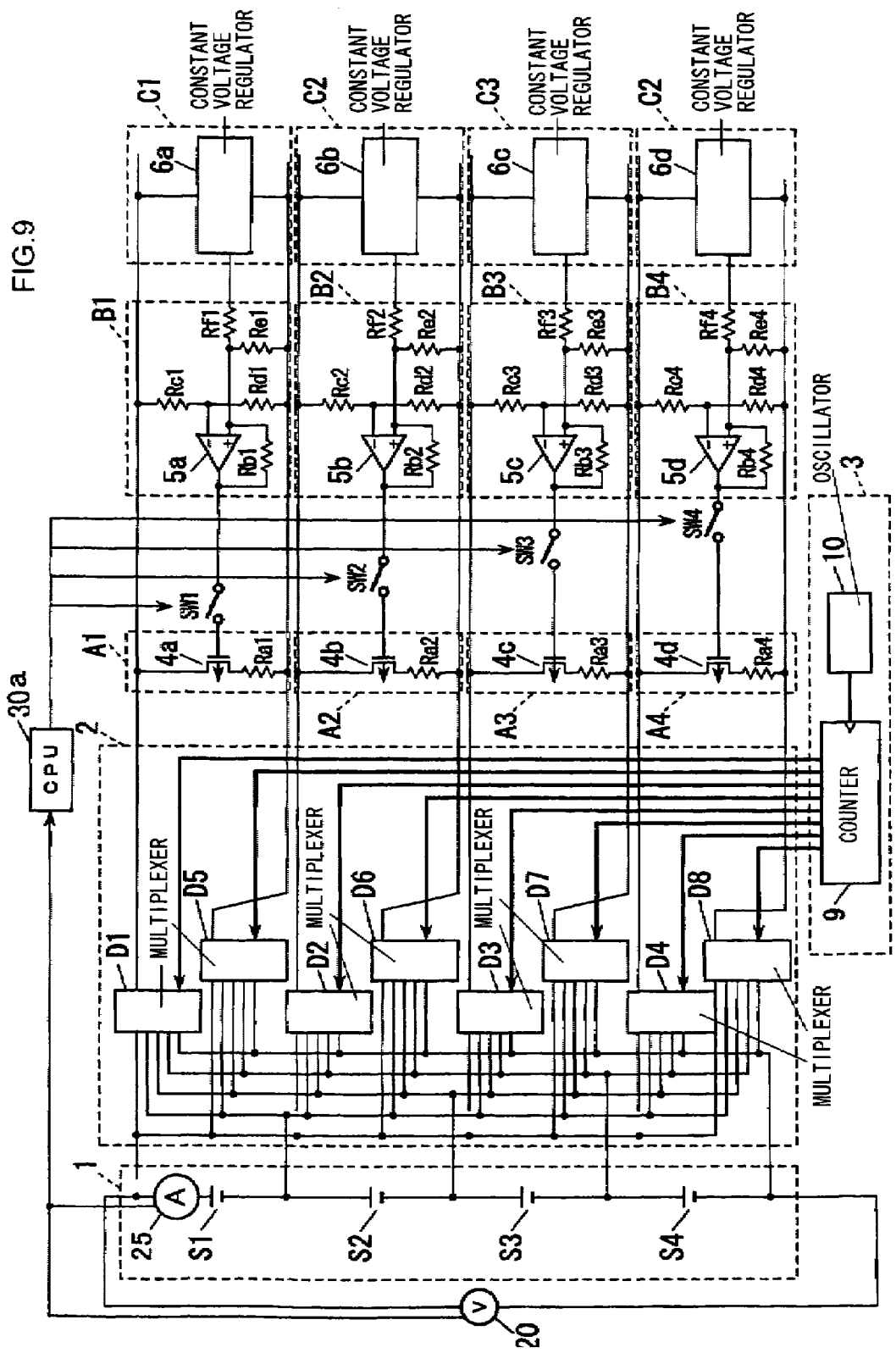
FIG. 9 shows the structure adopted in the battery pack capacity adjustment apparatus in a third embodiment.

FIG. 9 shows the structure of the battery pack capacity adjustment apparatus in the third embodiment. The battery pack capacity adjustment apparatus in the third embodiment further includes a current sensor 25 in addition to the components of the battery pack capacity adjustment apparatus in the second embodiment. The current sensor 25 detects the charge current flowing to the battery pack 1 and the discharge current flowing from the battery pack 1.

The battery pack capacity adjustment apparatus in the third embodiment sustains the switches SW1 through SW4 in an ON state while charging the battery pack 1 and sustains the switches SW1 through SW4 in an OFF state while the battery pack 1 is not being charged. A decision as to whether or not the battery pack 1 is being charged is made based upon the charge/discharge current detected by the current sensor 25.

Upon deciding that the battery pack 1 is being charged based upon the charge/discharge current detected by the current sensor 25, a CPU 30a sets the bypass circuits A1 through A4 in an operational state by turning on the switches SW1 through SW4. If, on the other hand, it is decided that the battery pack 1 is not being charged, it sets the bypass circuits A1 through A4 in a non-operational state by turning off the switches SW1 through SW4. With the bypass circuits A1 through A4 set in an operational state while the battery pack 1 is being charged, the charge power compensates for the quantity of power discharged during the capacity adjustment. In addition, by setting the bypass circuits A1 through A4 in a non-operational state during discharge, a rapid reduction in the voltages at the battery pack (at the individual cells) can be prevented.

The battery pack capacity adjustment apparatus achieved in the third embodiment, which sets the bypass circuits A1 through A4 in an operational state while the battery pack 1 is being charged and sets the bypass circuits A1 through A4 in a non-operational state while the battery pack is not being charged, is capable of executing effective capacity adjustment while preventing a rapid reduction in the voltage at the battery pack 1.

Fourth Embodiment

The battery pack capacity adjustment apparatus in the fourth embodiment adopts a structure identical to that of the battery pack capacity adjustment apparatus in the second embodiment shown in FIG. 7. The battery pack capacity adjustment apparatus in the fourth embodiment turns on the switches SW1 through SW4 when the cell SOC is equal to or greater than a first SOC and equal to or less than a second SOC. If, on the other hand, the cell SOC is less than the first SOC or greater than the second SOC, the battery pack capacity adjustment apparatus turns off the switches SW1 through SW4. The first SOC, which constitutes the SOC lower limit used in the control of charge/discharge of the battery pack 1, is set to 30% in this example. In addition, for the reason detailed later, the second SOC is set to 50%.

As indicated in FIG. 8, the voltage changes to a smaller extent relative to the change in the cell SOC once the cell SOC exceeds 50%, and for this reason, even a very slight inconsistency among the cell voltages may manifest as a significant difference in the SOC in this range. Thus, an SOC inconsistency may occur among the cells having undergone the capacity adjustment executed in the SOC range higher than 50%. Accordingly, the battery pack capacity adjustment apparatus in the fourth embodiment executes capacity adjustment if the cell SOC is equal to or less than the second SOC (50%) to minimize the extent of SOC inconsistency among the cells. It is to be noted that capacity adjustment is not executed when the cell SOC is less than the first SOC (30%), so as to prevent over-discharge of the cells.

A CPU 30b determines an average cell voltage by dividing the total voltage Vbat of the battery pack 1 detected by the voltage sensor 20 by the number of cells, i.e., four, and then ascertains the cell SOC based upon the average voltage and a table indicating the relationship between the cell voltage and the SOC such as that shown in FIG. 8. It outputs a control signal for turning on all the switches SW1 through SW4 to the switches SW1 through SW4 if the SOC thus ascertained is equal to or greater than the first SOC and equal to or less than the second SOC, whereas it outputs a control signal for turning off all the switches SW1 through SW4 to the switches SW1 through SW4 if the SOC having been ascertained is less than the first SOC or greater than the second SOC.

The battery pack capacity adjustment apparatus achieved in the fourth embodiment sets the bypass circuits A1 through A4 in an operational state over a range in which the extent of SOC changes small relative to the change in the voltage, i.e., when the cell SOC is equal to or greater than the first SOC and at the same time equal to or smaller than the second SOC, and sets the bypass circuits A1 through A4 in a non-operational state if the cell SOC is lower than the first SOC or higher than the second SOC. As a result, effective capacity adjustment is enabled by minimizing the extent of SOC inconsistency among the cells.

Fifth Embodiment

Figure 10:
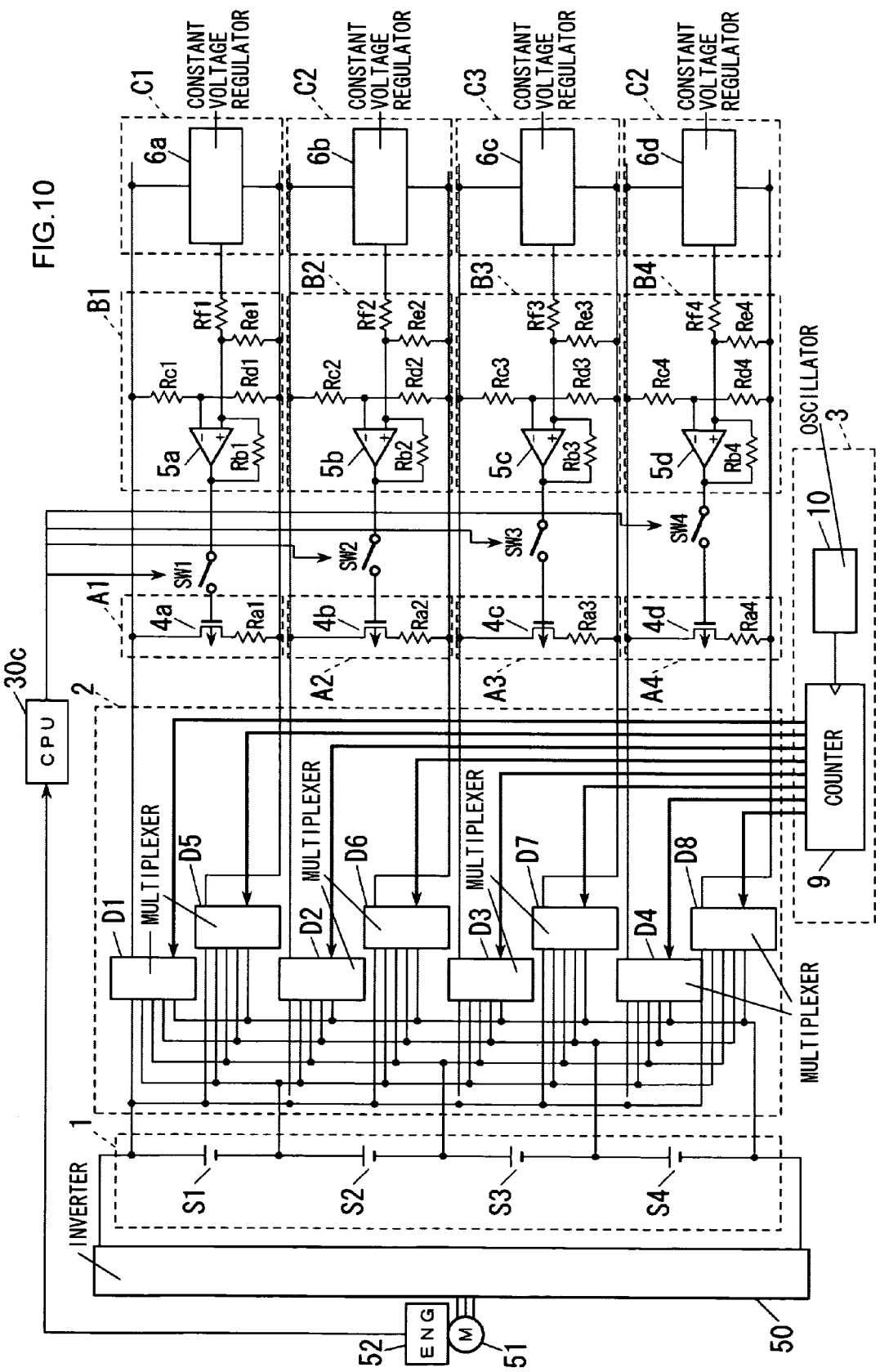
FIG. 10 is a block diagram of a system achieved by adopting the battery pack capacity adjustment apparatus in a fifth embodiment in a hybrid car.

FIG. 10 is a block diagram of the system of a hybrid car having adopted therein the battery pack capacity adjustment apparatus in the fifth embodiment. DC power stored in the battery pack 1 is converted to AC power at an inverter 50 and the AC power is then supplied to a motor 51. The motor 51 is utilized at least when starting up an engine 52.

During the period of time elapsing after the ignition switch (not shown) is turned on until the startup operation for the engine 52 is completed, a CPU 30c sustains all the switches SW1 through SW4 in an OFF state, and once the engine startup is completed, it turns on all the switches SW1 through SW4. The CPU 30c judges that the engine startup has been completed when the engine speed becomes equal to or faster than a predetermined engine speed, for instance.

When starting up the engine 52, the motor 51 is driven to rotate on with an electrical current supplied from the battery pack 1 to the motor 51. Thus, since the engine 52 may not be started up if the voltage at the battery pack 1 is low, the battery pack capacity adjustment apparatus achieved in the fifth embodiment sets the bypass circuits A1 through A4 in a non-operational state until the startup of the engine 52 is completed so as to ensure that the voltage at the battery pack 1 does not become low due to adjustment of the capacities at the individual cells before the engine startup is completed. The advantage of setting the bypass circuits A1 through A4 in a non-operational state until the startup of the engine 52 is completed is particularly significant when starting up the engine at low temperature since the quantity of power discharged from the battery pack 1 under such circumstances is greater than the quantity of power discharged while starting up the engine at normal temperature.

Sixth Embodiment

Figure 11:
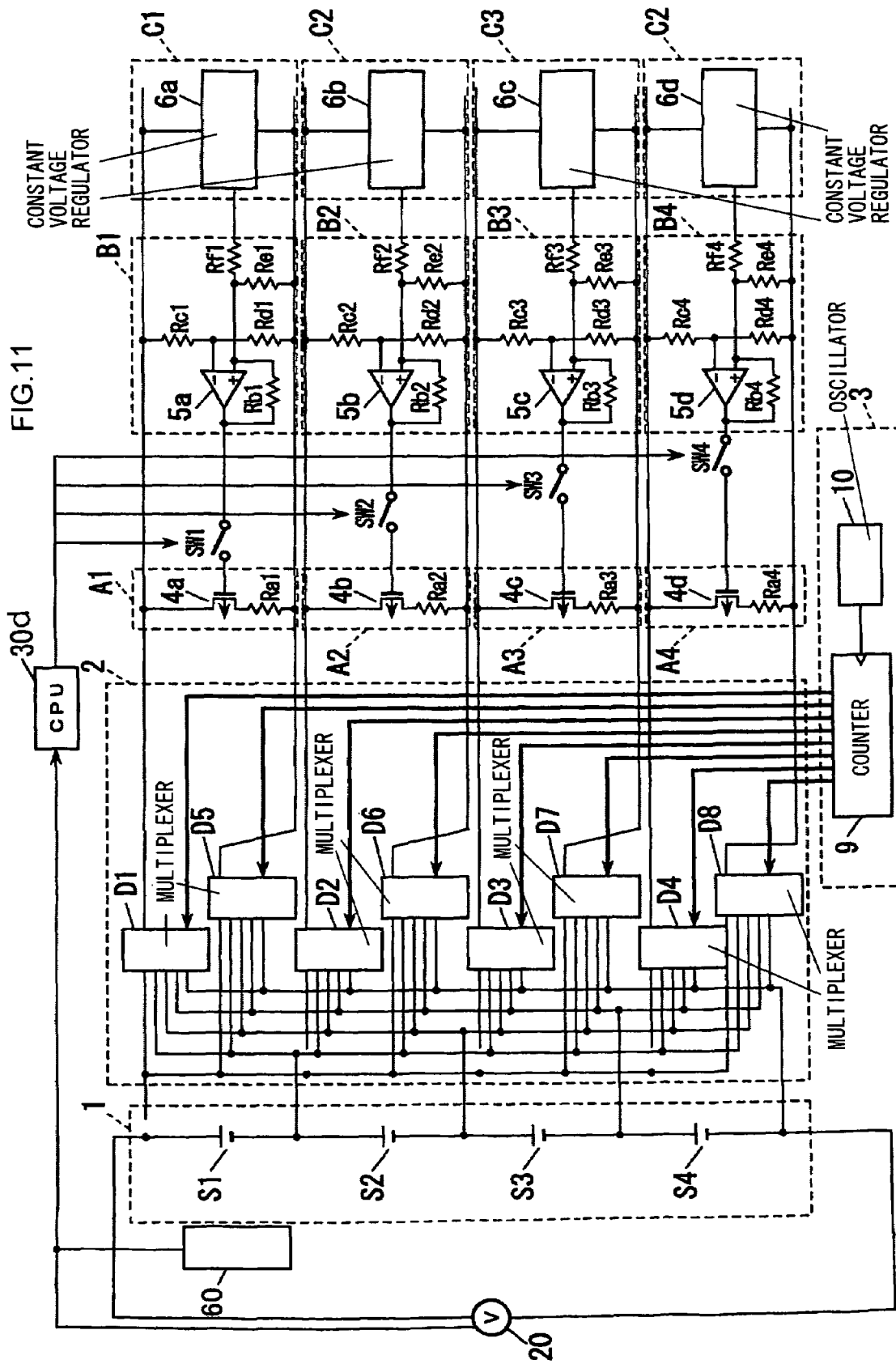
FIG. 11 shows the structure adopted in the battery pack capacity adjustment apparatus in a sixth embodiment.

FIG. 11 shows the structure of the battery pack capacity adjustment apparatus in the sixth embodiment. The battery pack capacity adjustment apparatus in the sixth embodiment further includes a temperature sensor 60 in addition to the components of the battery pack capacity adjustment apparatus in the second embodiment. The temperature sensor 60 detects the temperature at the battery pack 1.

If the temperature detected by the temperature sensor 60 is equal to or higher than a first temperature and equal to or lower than a second temperature, a CPU 30d turns on all the switches SW1 through SW4, whereas if the temperature detected by the temperature sensor 60 is lower than the first temperature or higher than the second temperature, it turns off all the switches SW1 through SW4. The first temperature may be, for instance, 0° C. and the second temperature may be, for instance, 60° C.

When the temperature at the battery pack 1 is low, the internal resistance in the battery increases to reduce the quantity of dischargeable power. Accordingly, the first temperature is set in advance as a lower-side temperature threshold value to disallow capacity adjustment for the cells when the temperature at the battery pack 1 is low, and the bypass circuits A1 through A4 are set in a non-operational state if the temperature at the battery pack 1 is lower than the first temperature.

In addition, when the temperature at the battery pack 1 is high, gas may be generated during charge/discharge. Accordingly, the second temperature is set in advance as a higher-side temperature threshold value, and the bypass circuits A1 through A4 are set in a non-operational state if the temperature at the battery pack 1 is higher than the second temperature. It is to be noted that the first temperature, i.e., the lower-side temperature threshold value, and the second temperature, i.e., the higher-side temperature threshold value, should be determined in advance by conducting tests or the like.

The battery pack capacity adjustment apparatus achieved in the sixth embodiment sets the bypass circuits A1 through A4 in an operational state when the temperature at the battery pack 1 is equal to or higher than the first temperature and equal to or lower than the second temperature, and sets the bypass circuits A1 through A4 in a non-operational state if the temperature at the battery pack 1 is lower than the first temperature or higher than the second temperature. As a result, capacity adjustment for the cells can be executed by taking into consideration the current state of the battery.

Seventh Embodiment

Figure 12:
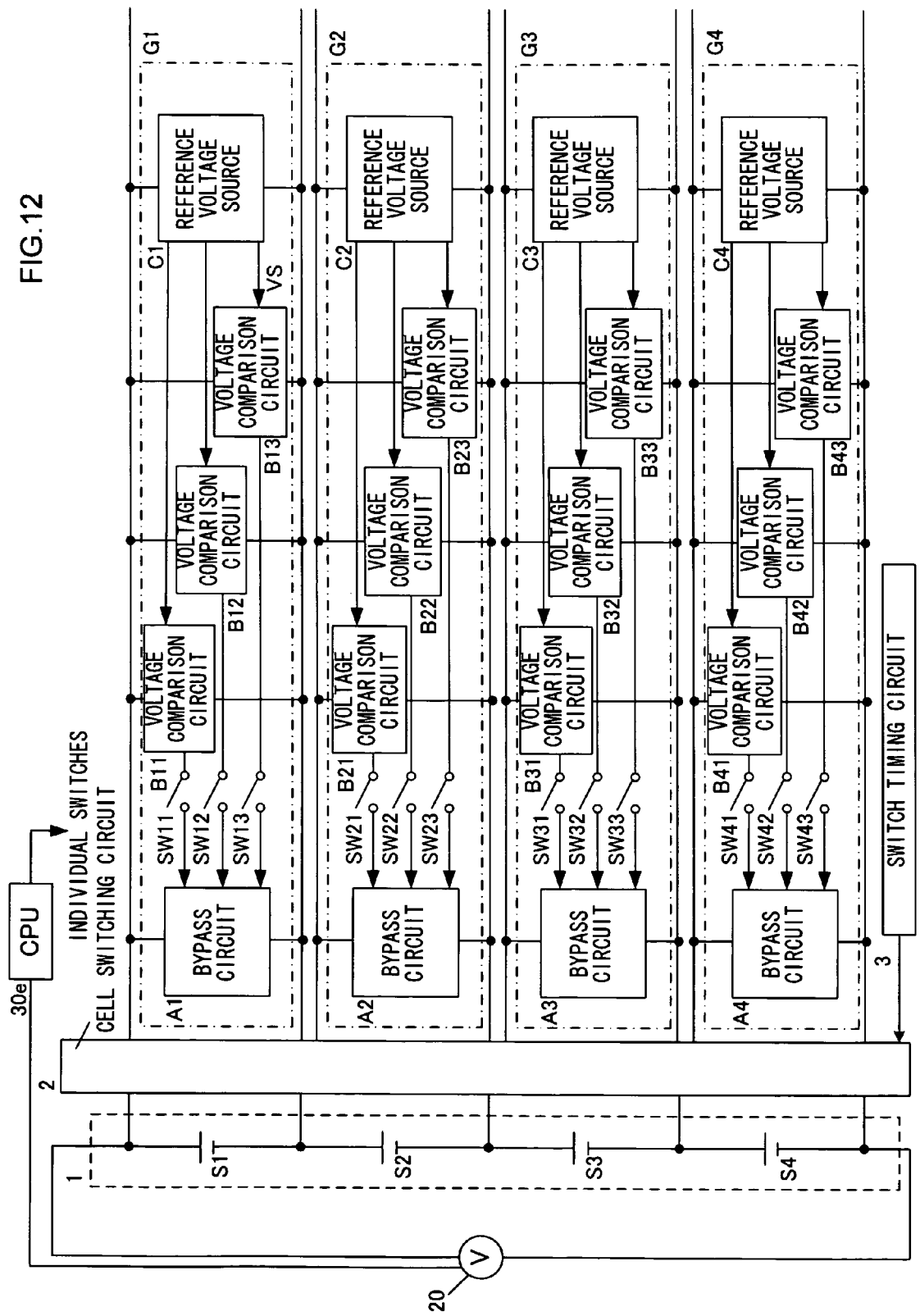
FIG. 12 shows the structure adopted in the battery pack capacity adjustment apparatus in a seventh embodiment.

FIG. 12 shows the structure adopted in the battery pack capacity adjustment apparatus in the seventh embodiment. While the battery pack capacity adjustment apparatuses in the first through sixth embodiments all have the same number of voltage comparison circuits B1 through B4 as cells s1 through s4, the battery pack capacity adjustment apparatus in the seventh embodiment includes a plurality of voltage comparison circuits in correspondence to each cell.

FIG. 12 shows an example in which three voltage comparison circuits are provided in conjunction with each cell. For instance, voltage comparison circuits B11, B12 and B13 are provided in conjunction with the cell s1. Different voltages are input from the reference voltage source C1 to the individual voltage comparison circuits B11, B12 and B13. In order to simplify the explanation, it is assumed that the voltage comparison circuit B11 engages the bypass circuit A1 in operation when the voltage at the cell s1 is higher than a bypass operating voltage Vbps1. Likewise, the voltage comparison circuit B12 engages the bypass circuit A1 in operation when the cell voltage is higher than a bypass operating voltage Vbps2, and the voltage comparison circuit B13 engages the bypass circuit A1 in operation when the cell voltage is higher than a bypass operating voltage Vbps3. A relationship expressed as Vbps1>Vbps2>Vbps3 exists among the bypass operating voltages Vbps1 through Vbps3.

In a similar manner, voltage comparison circuits B21 through B23 are provided in conjunction with the cell s2, voltage comparison circuits B31 through B33 are provided in conjunction with the cell s3 and voltage comparison circuits B41 through B43 are provided in conjunction with the cell s4. The voltage comparison circuits B21, B31 and B41 respectively engage the bypass circuits A2 through A4 in operation when the corresponding cell voltages are higher than the bypass operating voltage Vbps1. The voltage comparison circuits B22, B32 and B42 respectively engage the bypass circuits A2 through A4 in operation when the corresponding cell voltages are higher than the bypass operating voltage Vbps2. The voltage comparison circuits B23, B33 and B43 respectively engage the bypass circuits A2 through A4 in operation when the corresponding cell voltages are higher than the bypass operating voltage Vbps3.

Switches are disposed between the individual voltage comparison circuits and the bypass circuits. For instance, switches SW11 through SW13 are disposed respectively between the voltage comparison circuit B11 and the bypass circuit A1, between the voltage comparison circuit B12 and the bypass circuit A1 and between the voltage comparison circuit B13 and the bypass circuit A1. A CPU 30e executes ON/OFF control for the switches SW11 through SW13, SW21 through SW23, SW31 through SW33 and SW41 through SW43.

The CPU 30e determines an average cell voltage Vave by dividing the total voltage Vbat at the battery pack 1 detected by the voltage sensor 20 by the number of cells, i.e., four, turns on the switches disposed in correspondence to the voltage comparison circuits at which a bypass operating voltage higher than the average voltage Vave thus determined is set and turns off the other switches. For instance, if the average cell voltage Vave is lower than the bypass operating voltage Vbps1 and is higher than both the bypass operating voltages Vbps2 and Vbps3, it turns on the switches SW11, SW21, SW31 and SW41 and turns off all the other switches.

Figure 13:
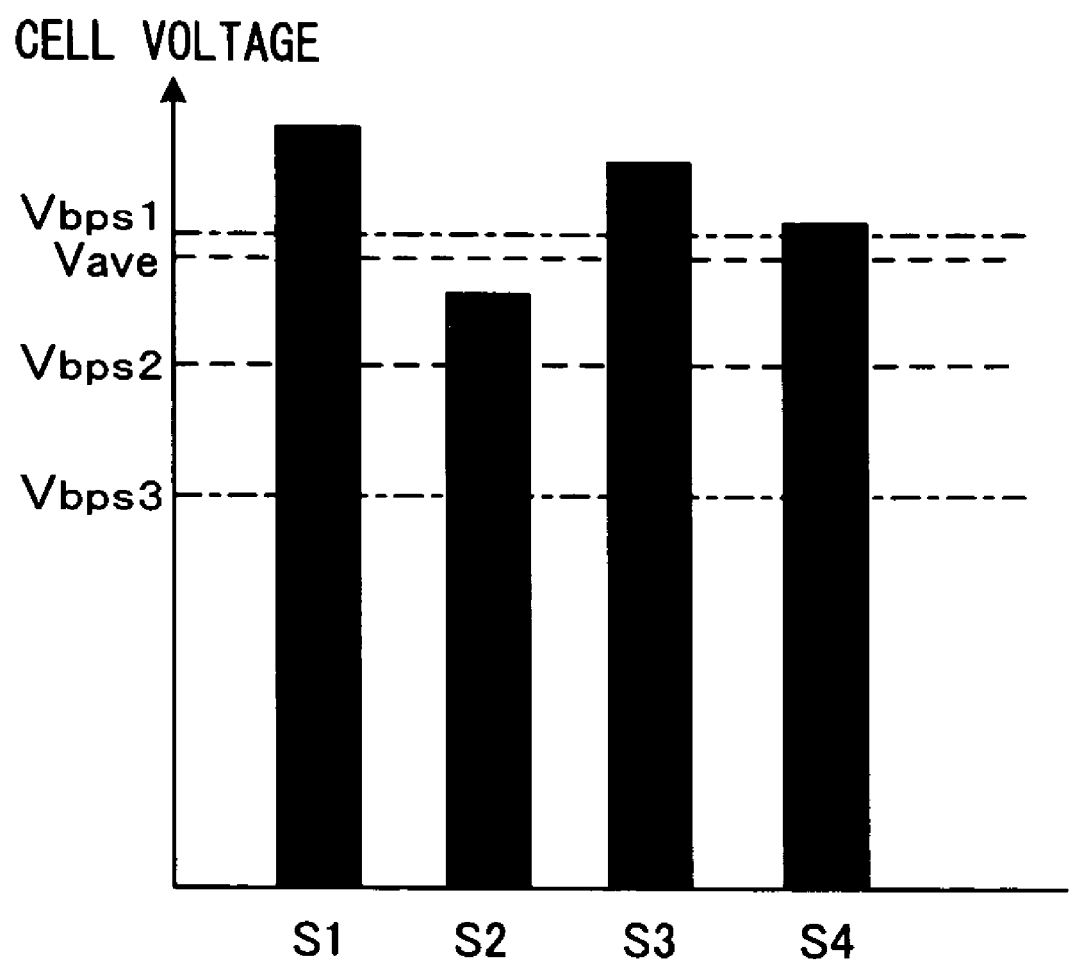
FIG. 13 shows inconsistency among the voltages at individual cells s1 through s4.

FIG. 13 shows varying voltages at the individual cells s1 through s4. As explained above, if the average cell voltage Vave is lower than the bypass operating voltage Vbps1 and higher than both the bypass operating voltages Vbps2 and Vbps3, only the switches SW11, SW21, SW31 and SW41 disposed in correspondence to the voltage comparison circuit B11, B21, B31 and B41 at which the bypass operating voltage Vbps1 is set enter an ON state. Accordingly, if the voltages at the individual cells are at the levels shown in FIG. 13, the cells s1, s3 and s4 with voltages higher than the bypass operating voltage Vbps1 are discharged.

In a capacity adjustment apparatus that includes a single voltage comparison circuit in conjunction with each of the cells s1 through s4 with the bypass operating voltage set to Vbps2 or Vbps3, all the cells s1 through s4 may be discharged during the capacity adjustment, which is wasteful. If, on the other hand, the bypass operating voltage is set to Vbps1, capacity adjustment will be executed only if the cell voltages are high.

The battery pack capacity adjustment apparatus achieved in the seventh embodiment includes a plurality of voltage comparison circuits in correspondence to each cell, turns on the switches disposed in correspondence to the voltage comparison circuits at which a bypass operating voltage higher than the average cell voltage is set and turns off all the other switches. As a result, optimal capacity adjustment is executed in correspondence to the levels of the voltages at the individual cells.

The present invention is not limited to the embodiments explained above. For instance, while the battery pack 1 is constituted by connecting in series four cells s1 through s4, the present invention is in no way restricted by the number of cells constituting the battery pack. In addition, the switching sequence through which the connections between the cells s1 through s4 and the bypass circuits A1 through A4 are switched is not limited to the sequence described above. While the number of bypass circuits A1 through A4 is the same as the number of cells s1 through s4, the number of bypass circuits may be smaller than the number of cells.

In the second embodiment, a cell SOC is determined, and if the cell SOC thus determined is equal to or greater than a predetermined SOC, the bypass circuits A1 through A4 are set in an operational state, whereas if the cell SOC is less than the predetermined SOC, the bypass circuits A1 through A4 are set in a non-operational state. Instead, an SOC may be determined for the battery pack 1, and the bypass circuits A1 through A4 may be set in an operational state if the SOC thus determined is equal to or greater than a predetermined SOC, whereas the bypass circuits A1 through A4 may be set in a non-operational state if the cell SOC is less than the predetermined SOC. It is to be noted that the SOC of the battery pack 1 may be determined by preparing in advance a table indicating the relationship between the voltage at the battery pack 1 and the SOC and referencing the table based upon the voltage at the battery pack 1 detected by the voltage sensor 20.

The battery pack capacity adjustment apparatus in the second embodiment does not switch connections between the plurality of cells s1 through s4 and the bypass circuits A1 through A4 while the bypass circuits A1 through A4 are in a non-operational state. In the third through sixth embodiments, too, the connections between the plurality of cells s1 through s4 and the bypass circuits A1 through A4 may remain unchanged while the bypass circuits A1 through A4 are in a non-operational state to dispense with unnecessary switching operations.

In addition, the bypass circuits A1 through A4 are set in an operational state if the cell SOC is equal to or greater than the first SOC and equal to or less than the second SOC, and are set in a non-operational state if the cell SOC is less than the first SOC or higher than the second SOC in the fourth embodiment. Instead, similar control may be executed by ascertaining the SOC for the battery pack 1 instead of the cell SOC. Namely, the bypass circuits A1 through A4 may be set in an operational state if the battery pack SOC is equal to or greater than a first SOC and equal to or less than a second SOC, and may be set in a non-operational state if the battery pack SOC is less than the first SOC or greater than the second SOC.

While the bypass circuits A1 through A4 remain in a non-operational state until the engine startup is completed in the battery pack capacity adjustment apparatus in the fifth embodiment, the bypass circuits A1 through A4 may instead remain in a non-operational state until the operation of an auxiliary machine (not shown) driven by an electrical current supplied from the battery pack 1 starts. In such a case, the voltage at the battery pack 1 is not allowed to become low prior to the drive of the auxiliary machine.

While an explanation is given in reference to the fifth embodiment on an example in which the battery pack capacity adjustment apparatus is adopted in a hybrid car, the battery pack capacity adjustment apparatus may be also adopted in an electric car. In such an application, the bypass circuits A1 through A4 should be sustained in a non-operational state until the vehicle startup is completed.

While three voltage comparison circuits are provided in conjunction with each cell in the battery pack capacity adjustment apparatus in the seventh embodiment, two voltage comparison circuits or four or more voltage comparison circuits may be provided in conjunction with each cell.

Figure 14:
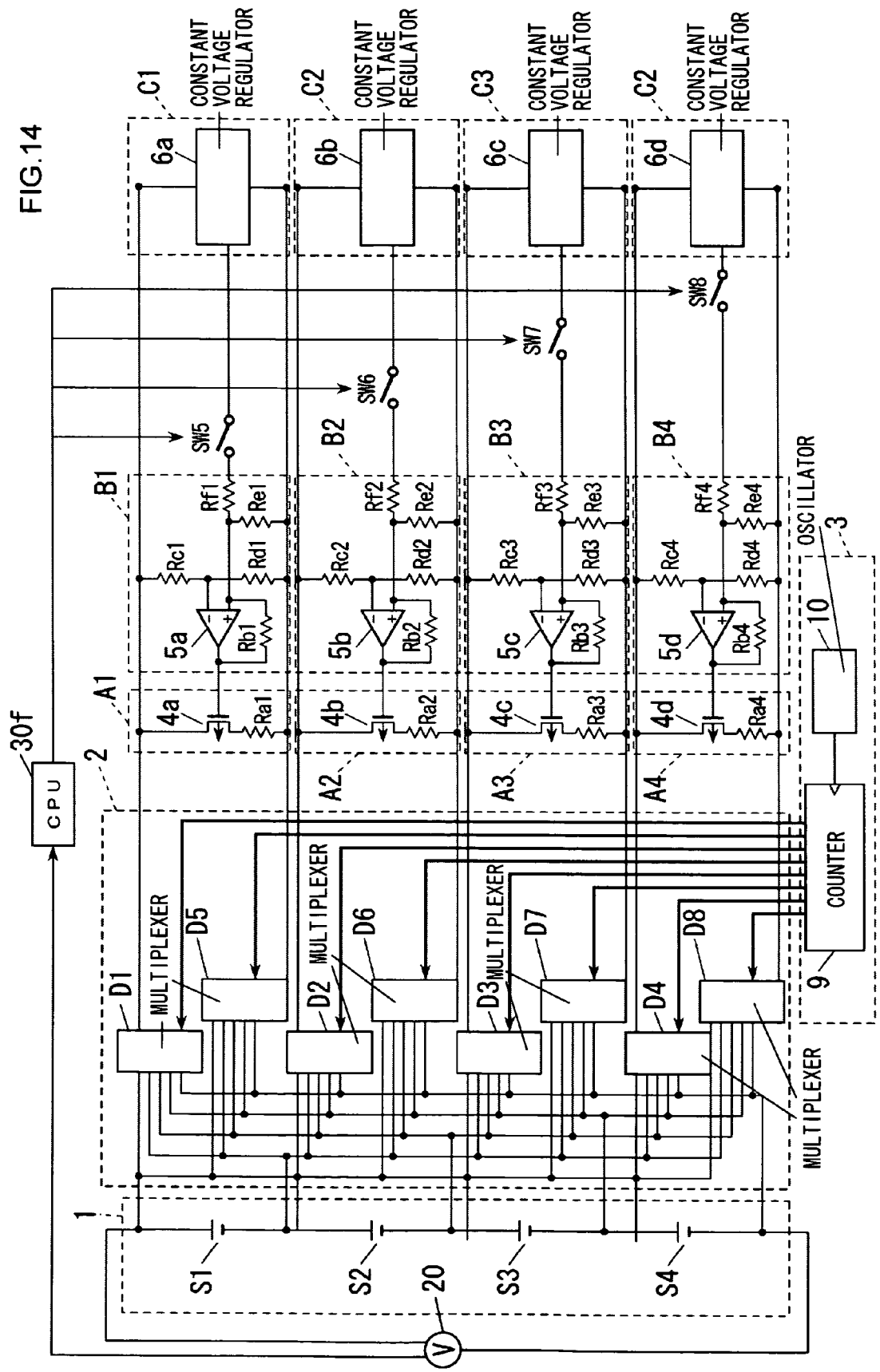
FIG. 14 shows a structure that includes switches disposed between the reference voltage sources and the corresponding voltage comparison circuits.

While switches are disposed between the voltage comparison circuits and the bypass circuits in the second through seventh embodiments, switches may instead be disposed between the reference voltage sources and the voltage comparison circuits. FIG. 14 shows switches SW5 through SW8 disposed between the reference voltage sources C1 through C4 and the corresponding voltage comparison circuits B1 through B4. As a CPU 30*f* turns on the switches SW5 through SW8, the bypass circuits A1 through A4 enter an operational state, whereas the bypass circuits A1 through A4 enter a non-operational state as the switches SW5 through SW8 are turned off.

While the connections between the cells and the bypass circuits are switched simultaneously for the individual cells in the first through seventh embodiments described above, connections may be switched, in sequence, one connection at a time. In this case, by detecting, for instance, the temperatures at the individual cells and switching the connections sequentially starting with the cell registering the highest temperature, the extent of inconsistency among the voltages at the individual cells can be reduced and overcharge or over-discharge of the cells can be prevented. Namely, since the internal resistance at a cell with a higher temperature is bound to be higher and the voltage at such a cell, too, is bound to be higher, executing the capacity adjustment sequentially starting with the cell registering the highest temperature, i.e., registering the highest voltage, reduces the extent of inconsistency among the voltages at the individual cells quickly.

Alternatively, the connections may be switched sequentially, starting with the cell disposed at a position where the temperature tends to rise readily, without detecting the temperatures at the cells. The position at which the temperature tends to rise readily may be, for instance, a location distanced from the cooling fan or a location where the air from the cooling fan does not easily reach.

The features of the battery pack capacity adjustment apparatuses in the second through seventh embodiments may be adopted in combinations. Namely, while various conditions under which the bypass circuits A1 through A4 are set in an operational state are described in reference to the second through seventh embodiments, the bypass circuits A1 through A4 may instead be set in an operational state if any of the plurality of conditions described above exists.

It is to be noted that the processing for switching the connections between the bypass circuits A1 through A4 and the cells s1 through s4 executed in the first embodiment may be started with any timing. For instance, it may be judged through detection that capacity adjustment via the bypass circuits A1 through A4 is underway and the switch processing may be executed only while the capacity adjustment is being executed.

The disclosure of the following priority applications are herein incorporated by reference:

Japanese Patent Application No. 2004-376620 filed Dec. 27, 2004

Japanese Patent Application No. 2005-268083 filed Sep. 15, 2005

What is claimed is:

1. A capacity adjustment apparatus for a battery pack constituted by connecting a plurality of cells in series, comprising:
   a plurality of capacity adjustment devices that discharge cells with voltages higher than a predetermined voltage; and
   a switching device that switches connection modes in each of which the plurality of cells and the plurality of capacity adjustment devices are connected in a different, non-fixed connection manner,
   wherein the switching device is capable of changing a connection correspondence relationship between any one of the plurality of capacity adjustment devices and any one of the plurality of cells,
   wherein each capacity of the cells constituting the battery pack is adjusted by each of the capacity adjustment devices, a number of the capacity adjustment devices being equal with a number of the cells, and
   wherein each of the plurality of capacity adjustment devices discharges a different one of the plurality of cells depending upon which of the connection modes is selected by way of the switching device, so that any one of the plurality of capacity adjustment devices can be selected to discharge any one of the plurality of cells as a target cell to be discharged.

2. A capacity adjustment apparatus for a battery pack according to claim 1, wherein:
   the switching device switches the connections between the plurality of cells and the plurality of capacity adjustment devices each time a predetermined length of time elapses,
   the switching device including a counter and an oscillator for counting up to the predetermined length of time, and
   the switching device including a plurality of multiplexers for switching the connection modes.

3. A capacity adjustment apparatus for a battery pack according to claim 1, further comprising:
   an SOC calculating device that determines an SOC of either a battery pack or a cell; and
   a control device that sets the capacity adjustment devices in a non-operational state if the SOC calculated by the SOC calculating device is less than a predetermined SOC and sets the capacity adjustment devices in an operational state if the SOC calculated by the SOC calculating device is equal to or greater than the predetermined SOC.

4. A capacity adjustment apparatus for a battery pack according to claim 1, further comprising:
   an SOC calculating device that determines an SOC of either a battery pack or a cell; and
   a control device that sets the capacity adjustment devices in an operational state if the SOC calculated by the SOC calculating device is equal to or greater than a first SOC and also equal to or less than a second SOC, and sets the capacity adjustment devices in a non-operational state if the SOC calculated by the SOC calculating device is less than the first SOC or greater than the second SOC.

5. A capacity adjustment apparatus for a battery pack according to claim 1, further comprising:
   a temperature detection device that detects a temperature at the battery pack; and
   a control device that sets the capacity adjustment devices in an operational state if the temperature detected by the temperature detection device is equal to or higher than a first temperature and also equal to or lower than a second temperature, and sets the capacity adjustment devices in a non-operational state if the temperature detected by the temperature detection device is lower than the first temperature or higher than the second temperature.

6. A capacity adjustment apparatus for a battery pack according to claim 1, further comprising:
   a charge decision-making device that makes a decision as to whether or not the battery pack is being charged; and
   a control device that sets the capacity adjustment devices in an operational state if the charge decision-making device determines that the battery pack is being charged and sets the capacity adjustment devices in a non-operational state if the charge decision-making device determines that the battery pack is not being charged.

7. A capacity adjustment apparatus for a battery pack according to claim 6, included in a system that starts up a vehicle by using power from the battery pack, wherein:
   the control device sustains the capacity adjustment devices in the non-operational state until vehicle startup is completed.

8. A capacity adjustment apparatus for a battery pack according to claim 1, further comprising:
   a temperature detection device that detects temperatures at the individual cells, wherein:
   the switching device sequentially switches the connections between the cells and the capacity adjustment devices starting with a cell registering the highest temperature among the temperatures at the individual cells detected by the temperature detection device.

9. A capacity adjustment apparatus for a battery pack according to claim 1, further comprising:
   an identifying device that identifies a cell disposed at a position where a high temperature tends to manifest readily, wherein:
   the switching device sequentially switches the connection between the cells and the capacity adjustment devices, starting with the cell identified by the identifying device.

10. A capacity adjustment apparatus for a battery pack according to claim 3, wherein:

the switching device does not switch the connections between the plurality of cells and the plurality of capacity adjustment devices while the capacity adjustment devices are sustained in the non-operational state by the control device, and switches the connections between the plurality of cells and the plurality of capacity adjustment devices while the capacity adjustment devices are sustained in the operational state by the control device.

11. A capacity adjustment apparatus for a battery pack according to claim 4, wherein:
the switching device does not switch the connections between the plurality of cells and the plurality of capacity adjustment devices while the capacity adjustment devices are sustained in the non-operational state by the control device, and switches the connections between the plurality of cells and the plurality of capacity adjustment devices while the capacity adjustment devices are sustained in the operational state by the control device.

12. A capacity adjustment apparatus for a battery pack according to claim 5, wherein:
the switching device does not switch the connections between the plurality of cells and the plurality of capacity adjustment devices while the capacity adjustment devices are sustained in the non-operational state by the control device, and switches the connections between the plurality of cells and the plurality of capacity adjustment devices while the capacity adjustment devices are sustained in the operational state by the control device.

13. A capacity adjustment apparatus for a battery pack according to claim 6, wherein:
the switching device does not switch the connections between the plurality of cells and the plurality of capacity adjustment devices while the capacity adjustment devices are sustained in the non-operational state by the control device, and switches the connections between the plurality of cells and the plurality of capacity adjustment devices while the capacity adjustment devices are sustained in the operational state by the control device.

14. A capacity adjustment apparatus for a battery pack according to claim 3, wherein:
the capacity adjustment devices each comprise a discharge device that discharges a cell and a voltage comparison device that compares a voltage at the cell with the predetermined voltage and engages the discharge device in operation if the voltage at the cell is higher than the predetermined voltage;
the capacity adjustment apparatus further comprises a connection/disconnection device that connects/disconnects the voltage comparison device and the discharge device from each other; and
the control device sets the capacity adjustment device in the operational state by connecting the voltage comparison device and the discharge device to each other with the connection/disconnection device and sets the capacity adjustment device in the non-operational state by disconnecting the voltage comparison device and the discharge device from each other with the connection/disconnection device.

15. A capacity adjustment apparatus for a battery pack according to claim 3, wherein:
the capacity adjustment devices each comprise a discharge device that discharges a cell and a voltage comparison device that compares a voltage at the cell with the predetermined voltage and engages the discharge device in operation if the voltage at the cell is higher than the predetermined voltage;
the capacity adjustment apparatus further comprises a reference voltage generating device that generates the predetermined voltage and inputs the predetermined voltage to the voltage comparison device and a connection/disconnection device that connects/disconnects the reference voltage generating device and the voltage comparison device with each other; and
the control device sets the capacity adjustment device in the operational state by connecting the reference voltage generating device and the voltage comparison device to each other with the connection/disconnection device and sets the capacity adjustment device in the non-operational state by disconnecting the reference voltage generating device and the voltage comparison device from each other with the connection/disconnection device.

16. A capacity adjustment apparatus for a battery pack according to claim 14, wherein:
a plurality of voltage comparison devices are disposed in conjunction with the discharge device disposed in correspondence to each cell and the plurality of voltage comparison devices compare the cell voltage with various predetermined voltage values;
the capacity adjustment apparatus further comprises an average voltage calculating device that calculates an average voltage among the plurality of cells constituting the battery pack; and
the connection/disconnection device connects the discharge device and a voltage comparison device at which a predetermined voltage higher than the average voltage calculated by the average voltage calculating device is set, and disconnects the discharge device and other voltage comparison devices.

17. A capacity adjustment apparatus for a battery pack according to claim 15, wherein:
a plurality of voltage comparison devices are disposed in conjunction with the discharge device disposed in correspondence to each cell and the plurality of voltage comparison devices compare the cell voltage with various predetermined voltage values;
the capacity adjustment apparatus further comprises an average voltage calculating device that calculates an average voltage among the plurality of cells constituting the battery pack; and
the connection/disconnection device connects the reference voltage generating device and a voltage comparison device at which a predetermined voltage higher than the average voltage calculated by the average voltage calculating device is set, and disconnects the reference voltage generating device and other voltage comparison devices.

18. A capacity adjustment apparatus for a battery pack constituted by connecting a plurality of cells in series, comprising:
a plurality of capacity adjustment means for discharging cells with voltages higher than a predetermined voltage; and
a switch means for switching connection modes in each of which the plurality of cells and the plurality of capacity adjustment means are connected in a different, non-fixed connection manner,
wherein the switch means is capable of changing a connection correspondence relationship between any one of the plurality of capacity adjustment means and any one of the plurality of cells,
wherein each capacity of the cells constituting the battery pack is adjusted by each of the capacity adjustment devices, a number of the capacity adjustment devices being equal with a number of the cells, and wherein each of the plurality of capacity adjustment means discharges a different one of the plurality of cells depending upon which of the Connection modes is selected by way of the switch means, so that any one of the plurality of capacity adjustment means can be selected to discharge any one of the plurality of cells as a target cell to be discharged.

19. A battery pack capacity adjustment method comprising:

discharging a cell with a voltage higher than a predetermined voltage among a plurality of cells constituting a battery pack via a plurality of capacity adjustment devices; and switching connection modes in each of which the plurality of cells and the plurality of capacity adjustment devices are connected in a different, non-fixed connection manner, wherein the switching step is capable of changing a connection correspondence relationship between any one of the plurality of capacity adjustment devices and any one of the plurality of cells, wherein each capacity of the cells constituting the battery pack is adjusted by each of the capacity adjustment devices, a number of the capacity adjustment devices being equal with a number of the cells, and wherein each of the plurality of capacity adjustment devices discharges a different one of the plurality of cells depending upon which of the connection modes is selected by way of the switching step, so that any one of the plurality of capacity adjustment devices can be selected to discharge any one of the plurality of cells as a target cell to be discharged.

20. A capacity adjustment apparatus for a battery pack according to claim 1, wherein the plurality of capacity adjustment devices include a first capacity adjustment device, a second capacity adjustment device, and a third capacity adjustment device, wherein the plurality of cells include a first cell, a second cell and a third cell, wherein the connection modes include a first connection mode, a second connection mode, and a third connection mode, wherein the first capacity adjustment device discharges the first cell in the first connection mode, wherein the second capacity adjustment device discharges the first cell in the second connection mode, and wherein the third capacity adjustment device discharges the first cell in the third connection mode.

21. A capacity adjustment apparatus for a battery pack according to claim 18, wherein the plurality of capacity adjustment means include a first capacity adjustment means, a second capacity adjustment means, and a third capacity adjustment means, wherein the plurality of cells include a first cell, a second cell and a third cell, wherein the connection modes include a first connection mode, a second connection mode, and a third connection mode, wherein the first capacity adjustment means discharges the first cell in the first connection mode, wherein the second capacity adjustment means discharges the first cell in the second connection mode, and wherein the third capacity adjustment means discharges the first cell in the third connection mode.

22. A battery pack capacity adjustment method according to claim 19, wherein the plurality of capacity adjustment devices include a first capacity adjustment device, a second capacity adjustment device, and a third capacity adjustment device, wherein the plurality of cells include a first cell, a second cell and a third cell, wherein the connection modes include a first connection mode, a second connection mode, and a third connection mode, wherein the first capacity adjustment device discharges the first cell in the first connection mode, wherein the second capacity adjustment device discharges the first cell in the second connection mode, and wherein the third capacity adjustment device discharges the first cell in the third connection mode.

* * * * *